(12) United States Patent
Caban, II

(10) Patent No.: US 11,772,812 B1
(45) Date of Patent: Oct. 3, 2023

(54) MAGNETIC MOBILE AIRCRAFT COVER

(71) Applicant: Daniel Robert Caban, II, Newport News, VA (US)

(72) Inventor: Daniel Robert Caban, II, Newport News, VA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 202 days.

(21) Appl. No.: 17/016,369

(22) Filed: Sep. 9, 2020

(51) Int. Cl.
*B64D 45/00* (2006.01)

(52) U.S. Cl.
CPC .................. *B64D 45/00* (2013.01)

(58) Field of Classification Search
CPC .... B64D 2045/0085; B64D 2045/0095; B64D 45/00
See application file for complete search history.

(56) References Cited

U.S. PATENT DOCUMENTS

| | | | | |
|---|---|---|---|---|
| 5,267,763 | A * | 12/1993 | Klein | B60R 13/04 428/31 |
| 5,340,055 | A * | 8/1994 | Rodyniuk | B64F 1/005 244/1 R |
| 5,919,541 | A * | 7/1999 | Emory | B32B 33/00 211/DIG. 1 |
| 7,494,098 | B1 * | 2/2009 | Fulda | B65F 1/141 248/156 |
| 9,387,644 | B1 | 7/2016 | Brennan et al. | |
| 10,173,292 | B2 | 1/2019 | Fullerton et al. | |
| 10,204,727 | B2 | 2/2019 | Fullerton et al. | |
| 2003/0131916 | A1 * | 7/2003 | Alexander | G01P 13/025 150/154 |
| 2007/0094763 | A1 * | 5/2007 | Silver | A41D 27/28 2/69 |
| 2013/0146453 | A1 * | 6/2013 | Foo | H01F 7/0284 29/525.01 |
| 2014/0007913 | A1 * | 1/2014 | Jennings | E04H 6/04 135/96 |
| 2015/0071483 | A1 * | 3/2015 | Shinotsuka | H04R 9/04 381/423 |
| 2019/0300199 | A1 * | 10/2019 | Hausmann | G01V 3/081 |
| 2020/0039662 | A1 * | 2/2020 | Descheemaeker | B64F 1/005 |
| 2021/0024276 | A1 | 1/2021 | Bradley | |

* cited by examiner

*Primary Examiner* — Quen Zhen Wang
*Assistant Examiner* — Mancil Littlejohn, Jr.
(74) *Attorney, Agent, or Firm* — AFMCLO/JAZ; Jeffrey V. Bamber

(57) ABSTRACT

A cover for an aircraft opening or equipment formed from a collapsible material having programmable magnets encapsulated on at least one edge portion to adhere the cover to an aircraft surface is provided. The programmable magnets have a close field strength sufficient to maintain the cover in place during high winds while not damaging the aircraft surface coatings during installation and removal while not interfering with electric signals or nearby electrical equipment.

21 Claims, 3 Drawing Sheets

MAGNETIC MOBILE AIRCRAFT COVER

RIGHTS OF THE GOVERNMENT

The invention described herein may be manufactured and used by or for the Government of the United States for all governmental purposes without the payment of any royalty.

FIELD OF THE INVENTION

The present invention relates generally to protective covers for aircraft, and more particularly to portable protective covers.

BACKGROUND OF THE INVENTION

Protective covers are often used on aircraft when not in operation in order to prevent damage to aircraft components and to prevent foreign objects and the elements from entering openings such as engine inlets, engine exhausts, and Pitot tubes. Current covers in use are often large and bulky and in the case of certain military aircraft have to travel separately due to the volume being much larger than what can be carried in the aircraft. Multiple sets of covers are often required in order for a military aircraft to be deployed from one location to another, including at intermediate stops, necessitating substantial expenditures for such duplicative equipment. One cover technology uses a foam material that can provide compressive forces to position and maintain the cover in place, however insertion and removal of the cover has been known to damage surfaces the cover is in contact with, and in particular damage to coatings on those surfaces that may require repair.

SUMMARY OF THE INVENTION

The present invention overcomes the foregoing problems and other shortcomings, drawbacks, and challenges of protecting aircraft surfaces and components, including engines and exhausts with covers. This invention uses cover technology that can be reconfigured to a very small volume for storage while enabling deployment to the configuration required as a protective cover and further enables removable attachment to the aircraft without damage to surfaces.

According to one disclosed embodiment, a protective cover provided formed from a collapsible material, such as the fabric, programmable magnets encapsulated on at least one edge portion, such as by stitching fabric over the programmable magnets. The programmable magnets are of a variety such as known to those skilled in the art providing a very high field strength for a very short distance due to having both North and South poles on one surface, and a multiplicity of magnets available in a single metal piece. Programmable magnets are more fully described in U.S. Pat. No. 10,173,292, the disclosure of which is incorporated herein by reference. U.S. Pat. No. 10,173,292 discloses programmable magnets comprising coded magnet structures that typically include a parallel array of a number of magnets having both North and South poles that are joined to each other side-by-side with some of the magnets oriented N-S interspersed with other magnets in the opposite orientation, or S-N. The magnets include some magnets with the same polarity that are arranged side-by-side so as to require the magnets to be bonded to each other in order to hold them together in view of the tendency for magnets in such an arrangement to repel and reorient themselves. The magnets that are oriented N-S have their North pole on a first surface of the programmable magnet and their South pole on an opposing second surface of the programmable magnet. The other magnets that are oriented S-N have their South pole on the first surface and their North pole on the opposing second surface. Use of programmable magnets enables high adherence when in place while not interfering with electrical equipment that is close by. Programmable magnets can also be tailored to provide higher strength in one area than another. Conventional magnets provide field strength at a distance that can interfere with nearby electrical equipment and can damage coatings on the surface of the aircraft if they were used, thus magnets have not been used previously for covers. The covers must have sufficient adherence to the aircraft to withstand substantial wind loads. Current foam based covers are designed to have a substantial pressure applied to the adjacent surface to maintain position under high winds, and all surfaces have essentially the same load applied, resulting in damage to contacted surfaces, particularly coatings on such surfaces. Using programmable magnets adherence can be increased in portions subject to higher loads and less in other areas.

In another embodiment the fabric is a fire resistant ballistic material including antistatic fibers such as available commercially as Nomex® III A. Such a fabric can provide a thickness that prevents the programmable magnets from forming a field strength to each other making them difficult to separate for protective cover installation.

While the invention will be described in connection with certain embodiments, it will be understood that the invention is not limited to these embodiments. To the contrary, this invention includes all alternatives, modifications, and equivalents as may be included within the spirit and scope of the present invention. Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

BRIEF DESCRIPTION OF THE ILLUSTRATIONS

Figure 1:
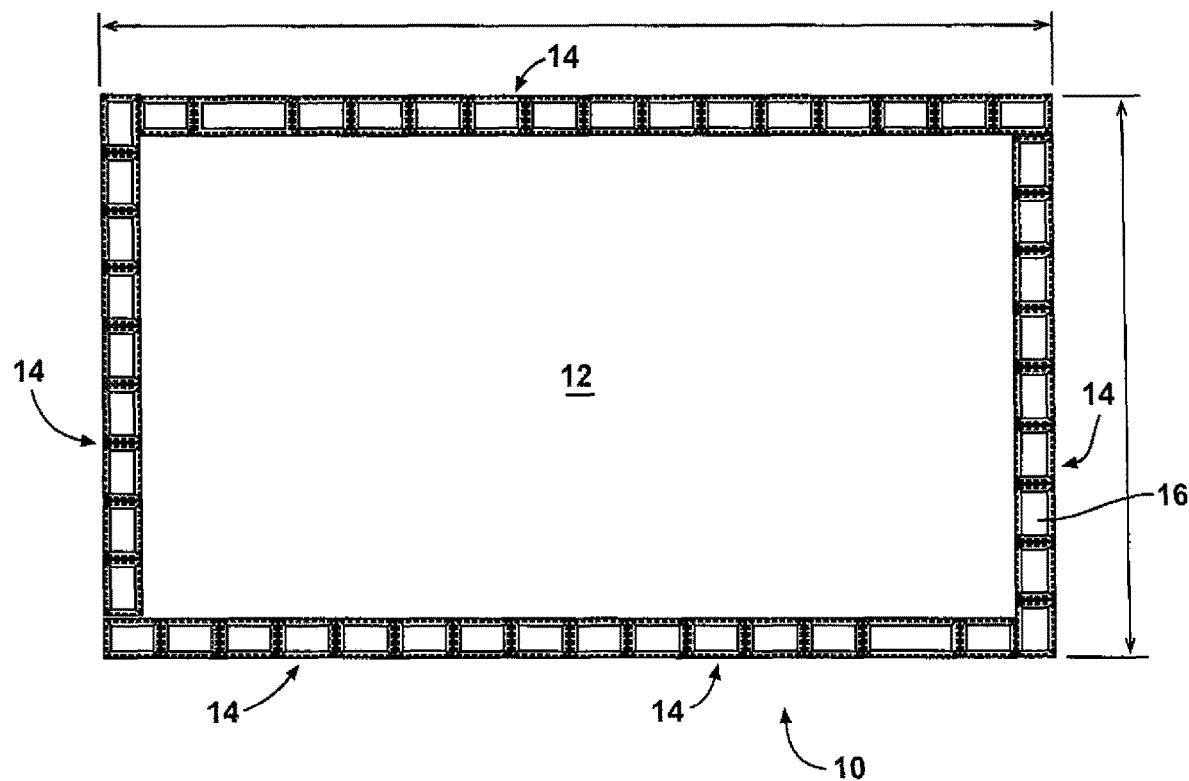

FIG. 1 is an illustration of one embodiment of a mobile magnetic aircraft cover.

Figure 2:
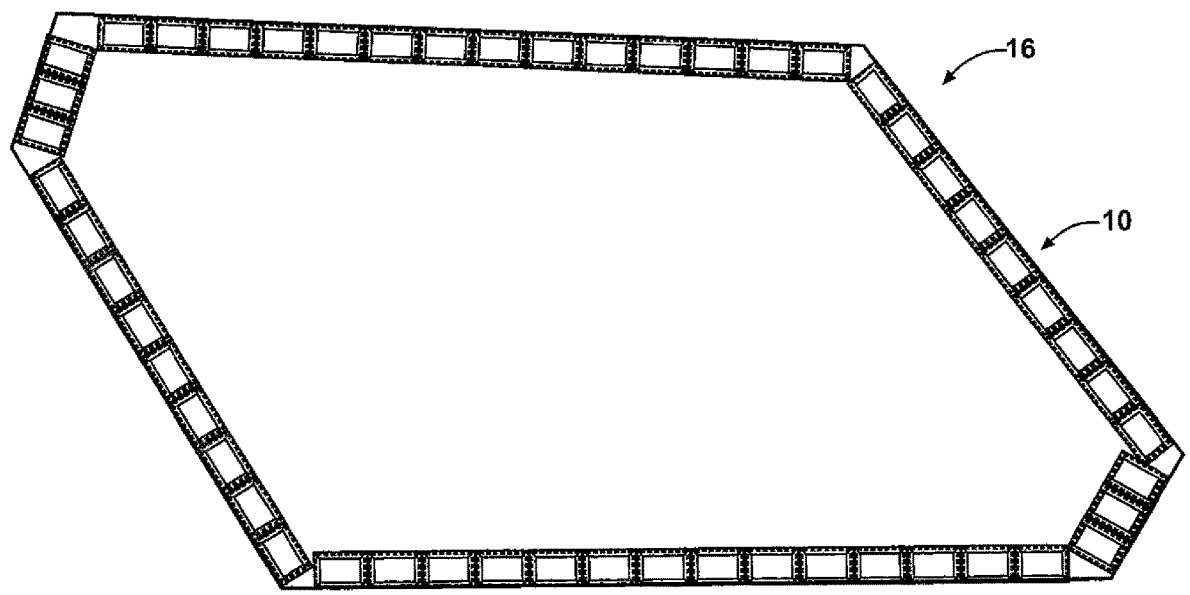

FIG. 2 is an illustration of another embodiment of a mobile magnetic aircraft cover.

Figure 3:
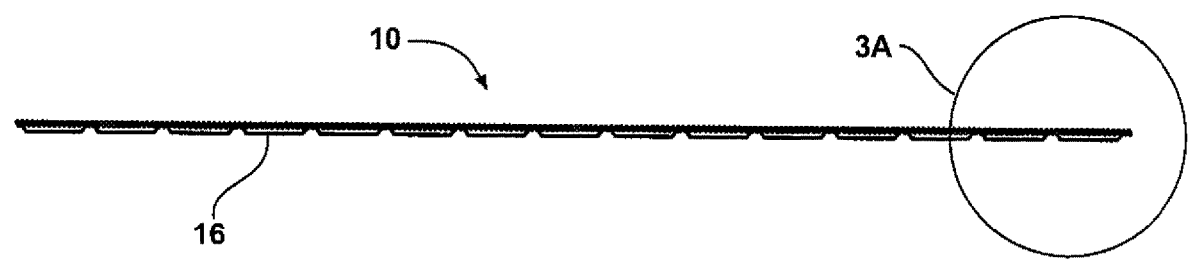

FIG. 3 is an illustration of a side view of the embodiment of FIG. 1.

Figure 3A:
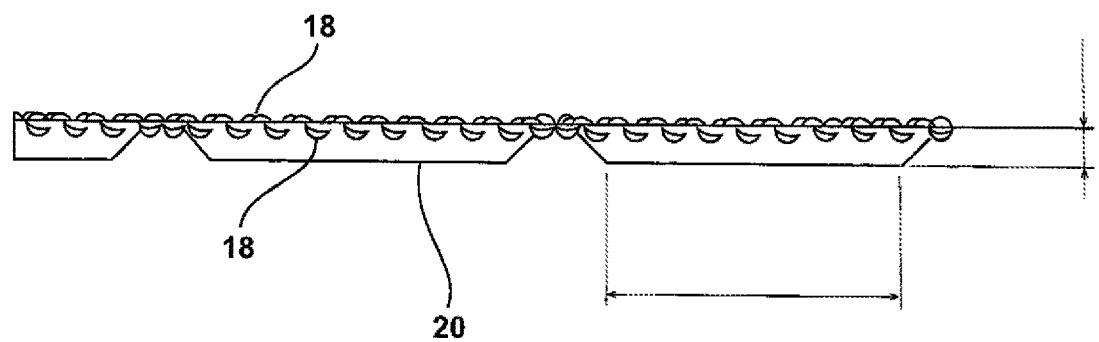

FIG. 3A is an enlarged sectional view of noted as 3A in FIG. 3.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of the embodiments of the present invention and should not be construed as in any way limiting the scope of the invention.

As shown in FIG. 1, a protective cover 10 is shown as a magnetic mobile aircraft cover 12 for an engine exhaust is in the form of a rectangle with edge portions 14 including encapsulated programmable magnets 16. The protective cover 10 is formed from a fabric such as a fire resistant ballistic material including antistatic fibers. Such a fabric used for the protective cover is an improvement over the prior art foam coverage that would inhibit heat transfer away from the engine. The programmable magnets 16 enable the protective cover 10 to be placed in a desired location and can adhere to the surface of the aircraft engine exhaust as desired. FIG. 2 illustrates another embodiment of the protective cover 10 in the form of a polygonal magnetic mobile aircraft cover 18 for an engine inlet.

As shown in the side view of FIG. 3 the thickness of programmable magnets 16 is illustrated. FIG. 3A illustrates the encapsulation of the programmable magnets 16 by stitching 18 of fabric 20 over the programmable magnets 16.

While a series of programmable magnets is shown, lesser (or even one per side) programmable magnets "printed" with appropriate magnetism in appropriate areas can be accomplished, such as in accordance with the teachings U.S. Pat. No. 10,204,727, the disclosure of which is incorporated herein by reference.

While embodiments have been described in considerable detail in this and the appendices, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A protective aircraft cover having a surface and at least one edge portion, said cover comprising:
    a collapsible material having a thickness; and
    programmable magnets joined to said collapsible material for adhering said protective aircraft cover to an aircraft, said programmable magnets each comprising a single metal piece comprising a plurality of magnets joined directly to each other side-by-side with some of said magnets oriented with their North-South poles in one direction interspersed with other magnets oriented with their South-North poles in the opposite direction, wherein the magnets that are oriented North-South have their North pole on a first surface of the programmable magnet and their South pole on an opposing second surface of the programmable magnet and the other magnets that are oriented South-North have their South pole on the first surface and their North pole on the opposing second surface encapsulated in said cover at said edge portion.

2. The protective aircraft cover according to claim 1 configured to be removably attached to an aircraft engine having an inlet and to cover an aircraft engine inlet.

3. The protective aircraft cover according to claim 1 wherein some of the plurality of magnets comprising the single metal piece that comprises the programmable magnets have the same polarity orientation and are joined directly to each other side-by-side.

4. The protective aircraft cover according to claim 1 wherein said collapsible material is a fire resistant ballistic fabric including antistatic fibers.

5. The protective aircraft cover according to claim 1 wherein said collapsible material is a fabric and the programmable magnets are encapsulated by stitching the fabric around said programmable magnets.

6. The protective aircraft cover according to claim 5 wherein the collapsible material thickness is sufficient to prevent the magnetic field strength of the programmable magnets to cause adherence to one another when the collapsible material is collapsed upon itself, which would make it difficult to separate the magnets from each other for protective aircraft cover installation.

7. The protective aircraft cover according to claim 1 wherein at least one of said programmable magnets is programmed to have a magnetic field strength in a portion of said cover that is different from the magnetic field strength in other portions of said cover so that adherence is increased in portions subject to higher loads and less in other areas.

8. The protective aircraft cover according to claim 1 wherein a combination of one or more collapsible material thickness and a magnetic field strength of said programmable magnets enables adherence to an aircraft surface subject to wind loads greater than 40 mph.

9. The protective aircraft cover according to claim 1 wherein the programmable magnets have a magnetic field strength sufficient to adhere the protective cover to an aircraft while not causing damage to surface coatings.

10. The protective aircraft cover according to claim 1 wherein the programmable magnets have a magnetic field that does not interfere with electronic signals when installed on an aircraft.

11. The protective aircraft cover according to claim 2 which is in the form of a six-sided polygon having six edge portions, wherein four of said edge portions are in the configuration of a parallelogram with two opposing corners replaced with two shorter length edge portions, and said programmable magnets are encapsulated along said six edge portions.

12. The protective aircraft cover according to claim 1 configured to be removably attached to an aircraft engine having an exhaust and to cover the aircraft engine exhaust.

13. The protective aircraft cover according to claim 12 which is in the form of a rectangle having a central portion and four edge portions, wherein said programmable magnets are encapsulated along said four edge portions and said central portion is free of programmable weights.

14. The protective aircraft cover according to claim 1 configured to be removably attached to an aircraft having a Pitot tube thereon and to cover the aircraft Pitot tube.

15. A method of removably attaching a protective aircraft cover to a component of an aircraft, which aircraft has an engine having an inlet and an exhaust, said method comprising:

a. providing a protective aircraft cover having a surface and at least one edge portion, said cover comprising:
   a collapsible material having a thickness; and
   programmable magnets joined to said collapsible material for adhering said protective aircraft cover to an aircraft, said programmable magnets each comprising a single metal piece comprising a plurality of magnets joined directly to each other side-by-side with some of said magnets oriented with their North-South poles in one direction interspersed with other magnets oriented with their South-North poles in the opposite direction, wherein the magnets that are oriented North-South have their North pole on a first surface of the programmable magnet and their South pole on an opposing second surface of the programmable magnet and the other magnets that are oriented South-North have their South pole on the first surface and their North pole on the opposing second surface, wherein said programmable magnets are encapsulated in said cover at said edge portion;
b. attaching said protective aircraft cover to the aircraft engine in order to cover one of the aircraft's engine inlet or the engine exhaust.

16. The method of claim 15 wherein at least one of said programmable magnets is programmed to have a magnetic field strength in a portion of said cover that is different from the magnetic field strength in other portions of said cover so that adherence can be increased in portions subject to higher loads and less in other areas.

17. The method of claim 15 wherein a combination of one or more collapsible material thickness and a magnetic field strength of said programmable magnets enables adherence to an aircraft surface subject to wind loads greater than 40 mph.

18. The method of claim 15 wherein said protective aircraft cover provided in step a) is in a collapsed condition, wherein the collapsible material is a fabric that has sufficient thickness to prevent the magnetic field strength of the programmable magnets to cause adherence to one another when the collapsible material is collapsed, wherein said method further comprises opening the protective aircraft cover from its collapsed condition prior to step b).

19. The method of claim 15 wherein said protective aircraft cover covers the engine exhaust and said collapsible material is a fire resistant ballistic fabric including antistatic fibers, and said fabric permits heat transfer away from the aircraft engine.

20. The method of claim 15 wherein some of the plurality of magnets comprising the single metal piece comprising the programmable magnets have the same polarity orientation and are joined directly to each other side-by-side.

21. A protective aircraft cover having a surface and at least one edge portion, said cover comprising:
   a collapsible material having a thickness; and
   programmable magnets joined to said collapsible material for adhering said protective aircraft cover to an aircraft, said programmable magnets each comprising a single metal piece comprising a plurality of magnets joined together side-by-side with some of said magnets oriented with their North-South poles in one direction interspersed with other magnets oriented with their South-North poles in the opposite direction.

* * * * *